Sept. 4, 1962
G. STEINERT
3,053,615
METHOD FOR DRYING AND BURNING BLACK LIQUOR
Filed Dec. 15, 1959
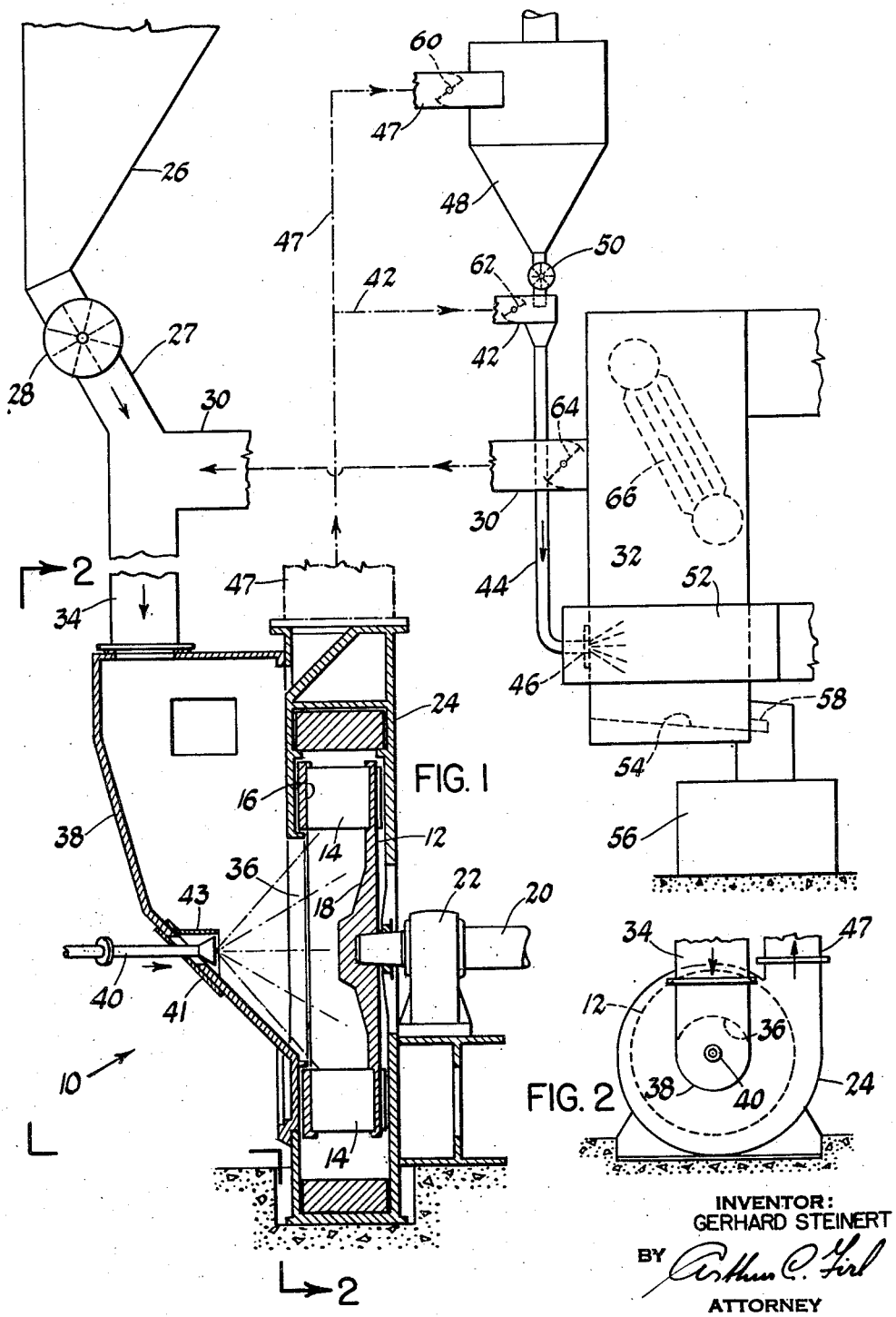
INVENTOR:
GERHARD STEINERT
BY Arthur C. Firl
ATTORNEY

United States Patent Office 3,053,615
Patented Sept. 11, 1962

3,053,615
METHOD FOR DRYING AND BURNING BLACK LIQUOR
Gerhard Steinert, Stuttgart, Germany, assignor to Kohlenscheidungs-Gesellschaft m.b.H., a corporation of Germany
Filed Dec. 15, 1959, Ser. No. 859,762
Claims priority, application Germany Dec. 19, 1958
8 Claims. (Cl. 23—48)

The invention relates to a method of drying and burning so-called black liquor, a concentrated pulp digester residual liquor derived from various pulping processes such as the sulphate, soda or sulphite process practiced in the paper making industry. The invention more specifically relates to a method of drying and burning black liquor wherein the concentrated liquor is sprayed into a hot gas stream, dried and then introduced with combustion air into the furnace of a steam generator for burning.

As hereinbefore practiced in the industry, the concentrated liquor is sprayed into a duct carrying hot gases for drying and for delivery of the dried particles into a furnace chamber while they are suspended in the drying gas. This method however suffers from the disadvantage that a large amount of liquor thus introduced adheres to the duct walls, where drying proceeds but slowly and unevenly. Since the amount of dried liquor particles dropping off the duct walls continually fluctuates, the quantity of dried particles transported by the gas stream being discharged into the furnace also fluctuates. This is highly undesirable, especially when the dried material is directly introduced into the furnace in a continuous stream, since under these circumstances it is practically impossible to maintain the constant fuel and air ratio which is so much desired for economical operation.

In accordance with the invention these disadvantages are avoided by introducing the concentrated liquor into the hot gas duct in the vicinity and in front of the fan, and into the fan inlet opening preferably in a direction which is generally coaxial with the axis of rotation of the fan rotor. During operation a cushion of compressed gas is produced surrounding the rotor blades of the fan. This cushion which moves at high velocity either in radial or axial direction depending on the type of fan. Accordingly, the finely divided liquor is successfully prevented from adhering to the fan blades and passes through the fan with the gas mass as an integral part thereof. Drying of the small black liquor droplets is therefore achieved in a uniform and speedy manner.

My invention finds an important application in installations in which the black liquor is burned together with pulverized coal. The inventive method is specifically useful in a system wherein a beater mill is employed performing the function both of a coal pulverizer and of a blower. In such a system hot furnace gases and crushed coal are fed to the suction inlet of the beater mill. In accordance with the invention, black liquor is added to the gas and fuel stream at a point directly in front of the mill inlet, preferably in a direction toward the beater wheel and coaxial to the axis of rotation thereof.

The various features and novelty which characterize my invention are pointed out with particularity in the claims annexed to and forming a part of this specification. For a better understanding of the invention however, and the advantages possessed by it, reference should be had to the accompanying drawing and descriptive matter in which I have illustrated and described a preferred embodiment of the invention.

Of the drawing:
FIG. 1 shows a schematic arrangement of a beater mill and fuel burning system employing the herein disclosed inventive method of burning black liquor either as a single fuel or in combination with pulverized coal;
FIG. 2 is a sectional front view of the beater mill or fan as taken on line 2—2 of FIG. 1.

The mill 10 comprises a beater wheel 12 having radially extending beater blades 14 supported between an annular disc 16 and a wheel disc 18. The beater wheel 12 is carried at the end of a shaft 20 journaled at 22 and driven by means not shown, to cause rotation of wheel 12 at high velocity within a mill housing 24. The housing is of a well known shape which spirally expands in direction of mill rotation as shown in FIG. 2. Pre-crushed coal is fed from coal bin 26 by way of duct 27 and coal gate 28 into a gas duct 30 through which flow hot furnace gases from combustion chamber 32. They intermix in a vertical shaft 34 and are introduced into the axial mill inlet 36 by way of mill door 38. In accordance with the invention a nozzle 40 projects through the front wall of mill door 38 in the vicinity and directly in front of the mill inlet 36. This nozzle is in adjustable manner fastened to the wall, such as by way of flange 41 and is connected to a source of black liquor not shown for discharging liquor of suitable concentration into the descending coal and gas stream in a direction which is preferably coaxial with the axis of rotation of the mill wheel 12. A shield 43 is provided above the black liquor nozzle 40 to protect it against abrasion by the descending coal. The preferred shape of the liquor spray is that of a cone having a configuration which protrudes into and substantially fills the circular axial inlet opening 36 of the beater mill housing 24. This shape and manner of spraying result in an even distribution of the liquor droplets throughout the hot gas and coal stream at the point of entry into the mill. The compressed gas cushion formed on the surfaces of the beater wheel parts during operation of the mill successfully prevents adherence of the liquor particles on the wheel. The liquor droplets instead are moved about in the hot gas stream and are speedily dried while being carried through the mill by the rotating gases.

As earlier stated herein my inventive method of drying and burning black liquor is equally applicable to a system wherein only black liquor is dried and burned, or to a system wherein a mixture of pulverized coal and black liquor is dried and burned. While I have described hereinabove a system and method for drying a mixture of pulverized coal and black liquor prior to burning the same apparatus could be used equally well for drying black liquor only and deliver it to a furnace chamber for burning.

For this purpose beater mill 10 is only required to perform the function of a mixer and transport fan by drawing hot gases out of the furnace chamber 32 via conduits 30, 34 and 38. In accordance with the invention black liquor is sprayed into the thus created stream of hot gases by way of nozzle 40 in the manner earlier described, the liquor droplets being uniformly and speedily dried as they are carried at high velocity through the fan by the rotating hot gases.

The dried liquor particles, if black liquor alone is burned, or the liquor particles and coal dust mixture, can be carried directly in the gas stream to the furnace chamber 32 by way of duct 42, pipe 44 and burner 46. Or the gas and fuel mixture can be discharged into the cyclone separator 48 via duct 47 for separation of the fuel particles from the moisture-laden gases. The fuel collected in the cyclone 48 is then fed into gas duct 42 by way of valve 50 for delivery to burner 46. Combustion air in a conventional manner is furnished from a source not shown to the burners via duct 42. While the combustible material in the black liquor is burned off, the residual chemicals accumulate on the hearth 54 of the furnace chamber and form a smelt which periodically is discharged into a smelt tank 56 by way of spout 58. Dampers 60, 62 and 64 are provided in ducts 47, 42 and 30 respectively, for regulating the flow of the gas and fuel mixture or flow of hot gases. Heating surfaces 66 for generating or superheating steam are provided in the path of the combustion gases, with the gases being released into the atmosphere after having given up a major portion of the heat contained therein.

What I claim is:

1. In a chemical recovery apparatus having a furnace chamber for the burning of black liquor and recovery of chemicals therefrom, and a fan capable of handling hot gases, said fan having an axial gas inlet, the method of drying and burning said liquor, comprising the steps of introducing a stream of hot gases into the axial inlet of said fan; separately conducting black liquor in the undried liquid state to a point located in front of said gas inlet; spraying said liquor into said stream immediately in front of the axial inlet opening of said fan; establishing uni-directional flow of said liquor with said gas stream; drying and solidifying said liquor by mixing with said hot gases while rotating within said fan, and feeding the resulting dry solids and gas mixture into said combustion chamber for burning and recovery of chemicals.

2. In a chemical recovery apparatus having a furnace chamber for the burning of black liquor and recovery of chemicals therefrom, and a fan capable of handling hot gases, said fan having an axial gas inlet, the method of drying and burning said liquor, comprising the steps of introducing a stream of hot gases into the axial inlet of said fan, separately conducting undried black liquor in the liquid state to a point adjacent said inlet, feeding said liquor in a finely divided spray into said stream in a direction generally toward and directly in front of said axial gas inlet of said fan, said spray covering the cross sectional area of said gas stream within the axial inlet opening of said fan; establishing uni-directional flow of said liquor with said gas stream; drying and solidifying said liquor by mixing with said hot gases while rotating within said fan, and feeding the resulting dry solids and gas mixture into said combustion chamber for burning and recovery of chemicals.

3. In a chemical recovery apparatus having a furnace chamber for the burning of black liquor and recovery of chemicals therefrom, and a fan capable of handling hot combustion gases, said fan having an axial gas inlet, the method of drying and burning said liquor, comprising the steps of introducing a stream of hot gases into the axial inlet of said fan, solitarily conducting concentrated undried liquor to a point directly opposite said inlet, feeding said liquor in a finely divided spray into said stream in a direction generally coaxial with the axis of rotation of said fan, said spray having an area of application substantially coextensive in diameter with the axial inlet opening of said fan, establishing uni-directional flow of said liquor with said gas stream, drying and solidifying said liquor by mixing with said hot gases while rotating within said fan, and feeding the resulting dry solids and gas mixture into said combustion chamber for burning and recovery of chemicals.

4. In a chemical recovery apparatus having a furnace chamber for the burning of black liquor and recovery of chemicals by smelting and a fan capable of handling hot combustion gases, said fan having an axial and generally circular fan inlet, the method of drying and burning said liquor, comprising the steps of introducing a stream of hot combustion gases into the axial inlet of said fan, feeding black liquor independently of said stream of gases to a location adjacent said fan inlet, introducing said liquor in a finely divided spray into said stream in a direction generally coaxial with the axis of rotation of said fan, said spray having a configuration which protrudes into and substantially fills the axial inlet opening of said fan, establishing uni-directional flow of said liquor with said gas stream, drying and solidifying said liquor by mixing with said hot gases while rotating within said fan, and feeding the resulting dry solids and gas mixture into said combustion chamber for burning and recovery of chemicals by smelting.

5. The method as defined in claim 3, wherein a substantial portion of the gases in said dry solids and gas mixture is separated therefrom, before feeding said dry solids to the combustion chamber for burning.

6. In a fuel burning system having a furnace chamber for burning finely divided coal and black liquor, and having a beater wheel arranged for rotation in a mill housing, said housing having an axial inlet for receiving said liquor, hot gases and coal for drying and grinding within said mill, the method of mixing, drying, and simultaneously burning said liquor and coal, comprising the steps of introducing a stream of hot combustion gases and coal into the axial inlet of said housing, conducting undried black liquor independently of said gas stream to the space directly in front of said beater wheel inlet, spraying said liquor into said stream of gas and coal into said space adjacent the axial inlet to said beater wheel, establishing uni-directional flow of said liquor with said hot gases and coal, drying and solidifying said liquor by mixing with said hot gases and coal while rotating within said mill, and feeding the resulting mixture of dry liquor solids, pulverized coal and gas to said combustion chamber for burning.

7. The method as defined in claim 6, wherein a substantial portion of the gases in said dry liquor solids, coal and gas mixture is separated therefrom before feeding said dry solids and coal to the combustion chamber for burning.

8. In a fuel burning system having a furnace chamber for burning finely divided coal and black liquor, and having a beater wheel arranged for rotation in a mill housing, said housing having an axial inlet for receiving said liquor, hot gases and coal for drying and grinding within said mill, the method of mixing, drying and simultaneously burning said liquor and coal, comprising the steps of introducing a stream of hot combustion gases and coal into the axial inlet of said housing, separately conducting undried black liquor in the liquid state to a point in front of and adjacent said inlet, feeding said liquor in a finely divided spray into said stream of gas and coal in a direction generally toward the axial inlet to said beater wheel, said spray covering a cross sectional area of said gas stream within the circular axial inlet opening of said mill housing, establishing uni-directional flow of said liquor with said gas and coal stream, drying and solidifying said liquor by mixing with said hot gases and coal while rotating within said mill, and feeding the resulting dry liquor solids, pulverized coal and gas mixture to said combustion chamber for burning.

References Cited in the file of this patent

UNITED STATES PATENTS

| | | |
|---|---|---|
| 1,426,030 | Zimmerman | Aug. 15, 1922 |
| 2,495,248 | Gagliardi | Jan. 24, 1950 |
| 2,809,817 | Monters | Oct. 15, 1957 |
| 2,944,801 | Katz | July 12, 1960 |

UNITED STATES PATENT OFFICE
CERTIFICATE OF CORRECTION

Patent No. 3,053,615 September 11, 1962

Gerhard Steinert

It is hereby certified that error appears in the above numbered patent requiring correction and that the said Letters Patent should read as corrected below.

In the sheet of drawing, line 1, for "Sept. 4, 1962" read -- Sept. 11, 1962 --.

Signed and sealed this 15th day of January 1963.

(SEAL)
Attest:

ERNEST W. SWIDER
Attesting Officer

DAVID L. LADD
Commissioner of Patents